US009704031B2

(12) United States Patent
Ross et al.

(10) Patent No.: US 9,704,031 B2
(45) Date of Patent: Jul. 11, 2017

(54) MEDIA IDENTIFICATION

(71) Applicants: Gary A Ross, Edinburgh (GB); Chao He, Dundee (GB)

(72) Inventors: Gary A Ross, Edinburgh (GB); Chao He, Dundee (GB)

(73) Assignee: NCR Corporation, Duluth, GA (US)

( * ) Notice: Subject to any disclaimer, the term of this patent is extended or adjusted under 35 U.S.C. 154(b) by 27 days.

(21) Appl. No.: 14/142,981

(22) Filed: Dec. 30, 2013

(65) Prior Publication Data

US 2014/0112570 A1    Apr. 24, 2014

Related U.S. Application Data

(62) Division of application No. 12/215,869, filed on Jun. 30, 2008, now Pat. No. 8,682,056.

(51) Int. Cl.
| | |
|---|---|
| G06K 9/00 | (2006.01) |
| G06K 9/68 | (2006.01) |
| B07C 5/00 | (2006.01) |
| G06K 9/74 | (2006.01) |
| G07F 9/02 | (2006.01) |
| G06K 9/20 | (2006.01) |
| G06K 9/54 | (2006.01) |
| G06K 9/62 | (2006.01) |
| G07D 7/12 | (2016.01) |
| G07D 7/162 | (2016.01) |
| G07D 7/20 | (2016.01) |
| G06T 7/33 | (2017.01) |
| G06T 7/12 | (2017.01) |

(52) U.S. Cl.
CPC ....... *G06K 9/00442* (2013.01); *G06K 9/2018* (2013.01); *G06K 9/54* (2013.01); *G06K 9/6202* (2013.01); *G06T 7/12* (2017.01); *G06T 7/337* (2017.01); *G07D 7/12* (2013.01); *G07D 7/162* (2013.01); *G07D 7/2058* (2013.01); *G06T 2207/10048* (2013.01); *G06T 2207/30176* (2013.01)

(58) Field of Classification Search
USPC ........... 382/137, 135, 218; 209/564; 356/71; 194/206
See application file for complete search history.

(56) References Cited

U.S. PATENT DOCUMENTS

| | | | | |
|---|---|---|---|---|
| 4,326,258 A | * | 4/1982 | de la Guardia | G06K 9/56 358/464 |
| 5,295,196 A | * | 3/1994 | Raterman | B65H 3/063 382/135 |

(Continued)

*Primary Examiner* — Kathleen Y Dulaney
(74) *Attorney, Agent, or Firm* — Schwegman, Lundberg & Woessner

(57) ABSTRACT

A method and apparatus for identifying a media item. The apparatus includes a module for receiving media items and capturing an image of a received media item. The method involves ascertaining external dimensions of the media item from the captured image; creating a monochromatic image based on high contrast boundaries within the captured image; matching the monochromatic image to one of a plurality of templates of media items of approximately the same external dimensions as the media item; and providing details of the matched template, including type and orientation of the media item corresponding to the matched template.

4 Claims, 6 Drawing Sheets

(56) References Cited

U.S. PATENT DOCUMENTS

| | | | | |
|---|---|---|---|---|
| 5,633,949 A * | 5/1997 | Graves | ................... | B65H 3/063<br>382/135 |
| 5,689,620 A * | 11/1997 | Kopec | .................. | G06K 9/6256<br>382/157 |
| 5,706,364 A * | 1/1998 | Kopec | .................. | G06K 9/6255<br>382/159 |
| 5,956,419 A * | 9/1999 | Kopec | .................. | G06K 9/6256<br>345/467 |
| 6,072,588 A * | 6/2000 | Dohnomae | .......... | H04N 1/6011<br>358/1.9 |
| 6,354,507 B1 * | 3/2002 | Maeda | ..................... | G07D 7/20<br>235/454 |
| 6,483,095 B1 * | 11/2002 | Iwaki | ..................... | G07D 7/12<br>250/205 |
| 6,539,104 B1 * | 3/2003 | Raterman | ............... | B65H 3/063<br>382/135 |
| 6,546,115 B1 * | 4/2003 | Ito | .................... | G08B 13/19602<br>348/169 |
| 6,792,133 B2 * | 9/2004 | Ott | ........................... | G06K 9/38<br>345/617 |
| 8,937,743 B1 * | 1/2015 | Kasuya | .................. | H04N 1/393<br>358/1.2 |
| 2001/0040994 A1 * | 11/2001 | Jang | ......................... | G07D 7/12<br>382/135 |
| 2002/0015145 A1 * | 2/2002 | Numata | ................. | G07D 7/121<br>356/71 |
| 2002/0044677 A1 * | 4/2002 | Fox | .......................... | G06K 9/00<br>382/135 |
| 2002/0057838 A1 * | 5/2002 | Steger | ................... | G06K 9/6203<br>382/197 |
| 2002/0126886 A1 * | 9/2002 | Jones | ................. | G06Q 20/1085<br>382/135 |
| 2004/0247169 A1 * | 12/2004 | Ross | .................... | G06K 9/6229<br>382/137 |
| 2005/0201609 A1 * | 9/2005 | Nakamura | ............... | G07D 7/00<br>382/135 |
| 2007/0253615 A1 * | 11/2007 | Chang | ...................... | G06K 9/00<br>382/135 |
| 2008/0030798 A1 * | 2/2008 | O'Neil | ................. | G07D 7/2016<br>358/448 |
| 2008/0118112 A1 * | 5/2008 | Gotoh et al. | ................... | 382/112 |
| 2008/0260279 A1 * | 10/2008 | Volovelsky | ........... | G06T 3/4076<br>382/254 |
| 2009/0034831 A1 * | 2/2009 | Amanullah | ........ | G01N 21/9501<br>382/145 |
| 2009/0141937 A1 * | 6/2009 | Abe | ................... | G06K 9/00234<br>382/103 |
| 2010/0102234 A1 * | 4/2010 | Hamasaki | .............. | G07D 7/121<br>250/341.7 |
| 2010/0166264 A1 * | 7/2010 | Blair | ....................... | G07D 7/06<br>382/112 |
| 2010/0239132 A1 * | 9/2010 | Biswas | .............. | G06K 9/00006<br>382/124 |

* cited by examiner

MEDIA IDENTIFICATION

CROSS-REFERENCE TO RELATED APPLICATION

This application is a Divisional Application of, and claims priority to, U.S. application Ser. No. 12/215,869, filed Jun. 30, 2008, entitled "MEDIA IDENTIFICATION," which is hereby incorporated by reference herein in its entirety for all purposes.

FIELD OF INVENTION

The present invention relates to media identification.

BACKGROUND OF INVENTION

Media identification, particularly identification of financial instruments, such as cheques, banknotes, and giros, is important for automated media validation systems.

An automated media validation system typically receives one or more media items (such as a banknote) and validates whether those media items are genuine. To speed up the validation process, it is more efficient to attempt to recognize what the media item is (or purports to be) prior to validating that item. This allows a one-to-one comparison (between the received media item and a template for that type of media item) to be implemented instead of a one-to-many comparison (between the received media item and each of the templates for every type of media item that can be received).

Recognition of inserted media items is also important because counterfeit media items are occasionally presented to automated validation systems (either inadvertently or fraudulently). It is important to be able to distinguish between (i) a media item purporting to be acceptable to the media validation system, and (ii) a media item not purporting to be acceptable to the media validation system (for example, a media item inserted by mistake, such as currency not accepted by the media validation system). This is because only media items purporting to be acceptable to the media validation system can actually be counterfeits. Some jurisdictions require counterfeit media items to be captured, but there is no requirement to capture a non-counterfeit media item that the automated media validation system does not process.

It is not advantageous to base a recognition system on any of the security features present in a media item (such as a watermark or a magnetic barcode in a banknote) because a counterfeit media item may not have those security features, so it would not be recognized as a potential counterfeit.

At present, typical recognition systems available are either not reliable enough (they do not accurately identify the type of media item sufficiently consistently) or not quick enough at identifying the media item presented.

It would be advantageous to be able to identify a media item being presented reliably and quickly so that if the media item purports to be genuine but is not validated then it can be captured as a counterfeit.

SUMMARY OF INVENTION

Accordingly, the invention generally provides methods, systems, apparatus, and software for media identification.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of identifying a media item, the method comprising: receiving an image of a media item from an imager; ascertaining external dimensions of the media item from the received image; creating a monochromatic image based on high contrast boundaries within the received image; matching the monochromatic image to one of a plurality of templates of media items of approximately the same external dimensions as the media item; and providing details of the matched template, including type and orientation of the media item corresponding to the matched template.

The media item may be in sheet form. The media item may be inserted into an automated media validation system as part of a bunch of media items, and separated into individual media items, or inserted individually. The media item may be a financial instrument, such as a cheque, a banknote, a giro, or the like.

The step of receiving an image of a media item from an imager may include receiving a plurality of images, each image relating to the same media item. The plurality of images may be provided as interleaved data. One image may comprise a transmission response of a monochromatic light (such as green light or red light), another image may comprise a reflected response of a monochromatic light (such as green light or red light), yet another image may comprise a transmission response of an infra-red light. Other images may comprise a transmission response and/or a reflected response of UV light.

The method may comprise one or more of the further steps of processing the received image(s) to deskew the image(s), deleting any image portions not related to the media item, and registering the received image(s) in a predetermined location.

The method may comprise the further step of cropping the registered image(s) to remove a portion of the image corresponding to the outer edge of the media item. This removes the influence of folds, edge aberrations, and the like that may be present on the edge of the physical media item.

The step of ascertaining external dimensions of the media item from the received image may be implemented by ascertaining the number of pixels corresponding to each edge of the media item; that is, the number of pixels in a row and the number of pixels in a column of the registered image.

The method may comprise the further step of identifying any vestiges of background data (that is, data captured as part of the received image but not related to the media item) and setting pixels corresponding to these vestiges to an average intensity (or a predetermined intensity intermediate (for example, approximately half-way between) the highest and lowest possible intensities). Vestiges of background data may be present because of tears, folds, or the like in the media item. These would allow the background to be visible, and consequently captured as part of an image.

The method may comprise the further step of contrast stretching the registered image(s) to reduce effects of wear, illumination variation, and the like. This may involve assigning a lowest number to the darkest pixels (for example, in an eight bit system 'zero' may be assigned to the darkest 1% of the image) and the highest number to the lightest pixels (for example, in an eight bit system '255' may be assigned to the lightest 1% of the image). In such a system, all pixels between the lightest and darkest 1% would be scaled linearly between 0 and 255. This enables the full dynamic range to be used. As a result of the contrast stretching step, an image is produced having at each pixel a value between "0" and "255".

The method may comprise the further step of scaling the registered (or contrast stretched) image(s) to a preset size. The preset size may be different for every type of media item; alternatively, every media item may be resized to the same fixed size, for example, forty millimeters (40 mm) by eighty millimeters (80 mm). Resizing the image may be implemented using any convenient technique, such as bilinear interpolation. The method may include storing the pre-scaled image size.

The step of creating a monochromatic image based on high contrast boundaries within the received image may be implemented by applying a Canny filter to the received image. As is known in the art, a Canny filter compares adjacent bits, where the difference between adjacent bits is below a preset threshold then the intensity is set to zero, and where the difference between adjacent bits is above the preset threshold then the intensity is set to a maximum value (which may be one for a binary system, "255" for an 8 bit system, and the like). This produces a binary image, where each pixel has one of two values: the minimum or the maximum. This technique is useful for identifying light and dark boundaries within an image. This facilitates comparison of one binary image with another, for example, using a Boolean operation.

Preferably, the step of creating a monochromatic image(s) may include the sub-step of dilating pixel areas having the minimum value (where most pixels in the image have the maximum value). Alternatively, for a media item in which most pixels in the image have the minimum value, the step of creating a monochromatic image(s) may include dilating pixel areas having the maximum value. Dilating pixel areas ensures that any slight difference in alignment is not crucial when one image is compared with another image (for example, from a template), or when one image is added to many other similar images (for example, when a template is being created from a relatively large number (more than twenty) of media items).

The step of matching the monochromatic image(s) to one of a plurality of templates of media items of approximately the same external dimensions as the media item may be implemented using any convenient technique, for example, using Boolean operations.

The step of providing details of the matched template, including type and orientation of the media item corresponding to the matched template, may include providing details of the currency, denomination, series, and orientation of the media item. The series may refer to a banknote series, particularly for jurisdictions having multiple series of banknotes in circulation concurrently.

The orientation may be one of face-up forward, face-up reverse, face-down forward, and face-down reverse.

According to a second aspect there is provided a method of creating a template for identifying a media item, the method comprising: (a) receiving an image of a media item from an imager; (b) creating a monochromatic image based on high contrast boundaries within the received image; (c) repeating steps (a) to (b) for another instance of the same type of media item (for example another hundred dollar bill of the same series) in the same orientation; and (d) averaging the monochromatic images to create a template for that type and orientation of media item.

The method may comprise the further step (b-1) of ascertaining external dimensions of the media item from the received image.

Step (c) may be implemented more than ten times, more than fifty times, more than a hundred times, or the like prior to implementing step (d). The greater the number of instances of the same type and orientation of media item that are averaged, the closer the template will be to a statistically average media item of that type. The method could, however, use just a single image to create the template.

The method may include (e) applying a threshold filter to the averaged monochromatic images to create a template with sharp edge boundaries.

According to a third aspect of the present invention there is provided a processor programmed to implement all of the steps of the first aspect of the invention.

The processor may be a digital signal processor (DSP), a Field Programmable Gate Array (FPGA), or the like.

According to a fourth aspect of the present invention there is provided a general purpose computer programmed to implement all of the steps of the second aspect of the invention.

According to a fifth aspect of the invention there is provided a module for validating media items, the module comprising a transport mechanism; a plurality of illumination sources arranged to illuminate an examination area of the transport mechanism; an optical imager aligned with the illumination sources; and a processor coupled to the optical imager and being arranged to capture an image of a media item; create a monochromatic image based on high contrast boundaries within the captured image; match the monochromatic image to one of a plurality of stored identification templates; and provide details of the matched template, including type and orientation of the media item corresponding to the matched template.

These and other aspects will be apparent from the following specific description, given by way of example, with reference to the accompanying drawings.

DETAILED DESCRIPTION

Figure 1:
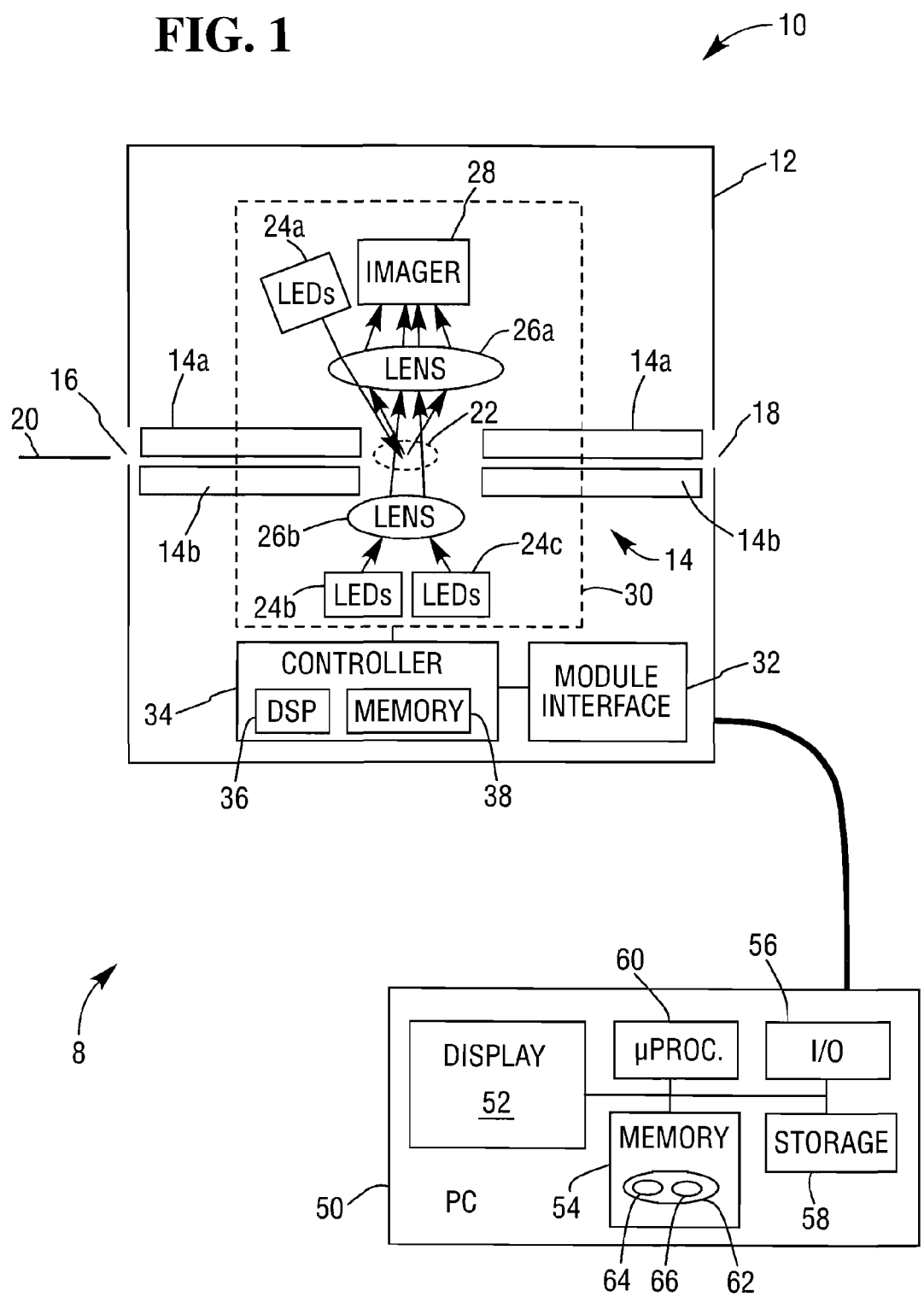
FIG. 1 is a schematic diagram of a system comprising a media validation module coupled to a personal computer (PC) for implementing a media identification method according to one embodiment of the present invention.

Reference is first made to FIG. 1, which is a schematic diagram of a system 8 comprising a media validation module 10 coupled to a personal computer (PC) 50 for implementing media identification according to one embodiment of the present invention.

The module 10 has a module housing 12 supporting a transport mechanism 14 in the form a train of pinch rollers comprising upper pinch rollers 14a aligned with lower pinch rollers 14b, extending from an entrance port 16 to a capture port 18.

The entrance and capture ports 16,18 are in the form of apertures defined by the housing 12.

In use, the pinch rollers 14a,b guide a media item (in this embodiment a banknote) 20 long edge first through an examination area 22 defined by a gap between adjacent pinch roller pairs. While the banknote 20 is being conveyed through the examination area 22, the banknote 20 is illuminated selectively by illumination sources 24, including an upper linear array of green LEDs 24a arranged to illuminate across the long edge of the banknote 20, a lower linear array of green LEDs 24a arranged to illuminate across the long edge of the banknote 20, and a lower linear array of infra-red LEDs 24c, also arranged to illuminate across the long edge of the banknote 20. The upper LEDs 24a are used for reflectance measurements; whereas, the lower LEDs 24b,c are used for transmission measurements.

When the upper green LEDs 24a are illuminated (the lower green LEDs 24b and the IR LEDs 24c being de-energized), a first optical lens 26a focuses green light onto the banknote 20 and reflections therefrom to an optical imager 28. This provides a reflected green channel output from the optical imager 28.

When the lower green LEDs 24b are illuminated (the upper green LEDs 24a and the IR LEDs 24c being de-energized), a second optical lens 26b focuses the emitted green light onto an underside of the banknote 20, and the first optical lens 26a focuses any light transmitted through the banknote 20 to the optical imager 28. This provides a transmitted green channel output from the optical imager 28.

Similarly, when the IR LEDs 24c are illuminated (the green LEDs 24a,24b being de-energized), the second optical lens 26b focuses IR light onto the banknote 20 and the second optical lens 26b focuses the emitted IR light onto an underside of the banknote 20, and the first optical lens 26a focuses any light transmitted through the banknote 20 to the optical imager 28. This provides a transmitted IR channel output from the optical imager 28.

The illumination sources 24, lenses 26, and imager 28 comprise an image collection component 30.

The module 10 includes a data and power interface 32 for allowing the module 10 to transfer data to an external unit, such as an ATM (not shown), and to receive data and power therefrom.

The module 10 also has a controller 34 including a digital signal processor (DSP) 36 and an associated memory 38. The controller 34 controls the pinch rollers 14 and the image collection component 30 (including energizing and de-energizing the illuminating sources 24). The controller 34 also collates and processes data captured by the image collection component 30, and communicates this data and/or results of any analysis of this data to the external unit via the data and power interface 32. The controller 34 receives the three channels (green reflected, green transmitted, and IR transmitted) from the optical imager 28.

The module 10 can be coupled to (and also decoupled from) the PC 50, as shown in FIG. 1. Although in some embodiments, a PC would not be needed (the module 10 performing all of the processing and data storage required), in this embodiment the PC 50 is used when templates are to be created because the PC 50 has better data processing and storage than the module 10. The module 10 may be coupled to the PC 50 directly, as shown in FIG. 1, or indirectly (via a network or the external unit (for example, an ATM)).

The PC 50 is a conventional type of PC comprising a display 52, memory 54 (in the form of SDRAM), input/output communications 56 (supporting USB standards (for connection of a keyboard, mouse, and the like), Ethernet, and the like), storage 58 (in the form of a hard drive), and a processor (or processors) 60. In addition, the PC 50 executes a conventional operating system (not shown) and a template creation program 62.

The template creation program 62 receives data (in the form of captured images of media items) from the module 10 and processes the data to create templates. These templates can then be transferred back to the module 10 for use in identifying subsequently entered media items. The template creation program 62 includes a conditioning component 64 and a template creation component 66.

Operation of the Media Validation Module

The media validation module 10 can operate in two modes.

The first mode is referred to as data collection mode. In data collection mode multiple media items (in this embodiment banknotes) of the same type are fed into the module 10. The module 10 captures images of these banknotes and transfers the images to the PC 50 to allow the PC 50 to create a template for that type of media item. A typical banknote template may be produced from, for example, a hundred samples; that is, a hundred different banknotes of the same type, series, and orientation may be inserted into the module 10 to create the template. The higher the number of samples used, the more statistically average the template will be for that type, series, and orientation of banknote.

The second mode the module 10 can operate in is referred to as identification mode. In identification mode, a single media item is fed into the module 10 and the module 10 identifies the type and orientation of the media item by matching one or more images of the media item to a template that was previously created and is stored locally at the module 10.

It should be appreciated that this media validation module 10 also includes software (coded into the DSP) for validating a media item once it has been identified. Such media validation software is known and will not be described in detail herein. The media validation software may include templates for validating media items, but these validation templates are different to the identification templates that are described herein. Suitable software and hardware for media validation is available from NCR Corporation, 1700 S. Patterson Blvd, Dayton, Ohio 45479, U.S.A., which is the assignee of the present application.

Data Collection Mode for Template Creation

Figure 2A:
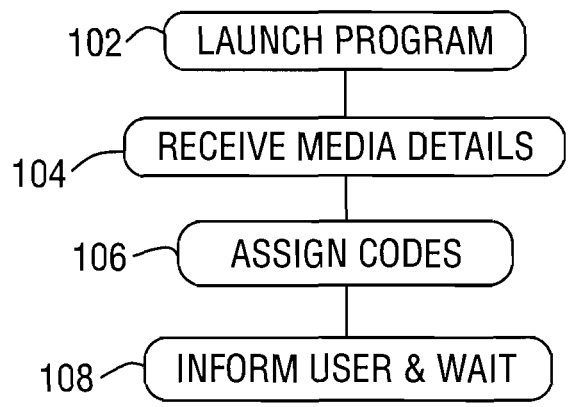
FIGS. 2a to 2c are flowcharts illustrating steps in capturing and processing images for a specific type and orientation of media item inserted into the media validation module of FIG. 1.
Figure 2B:
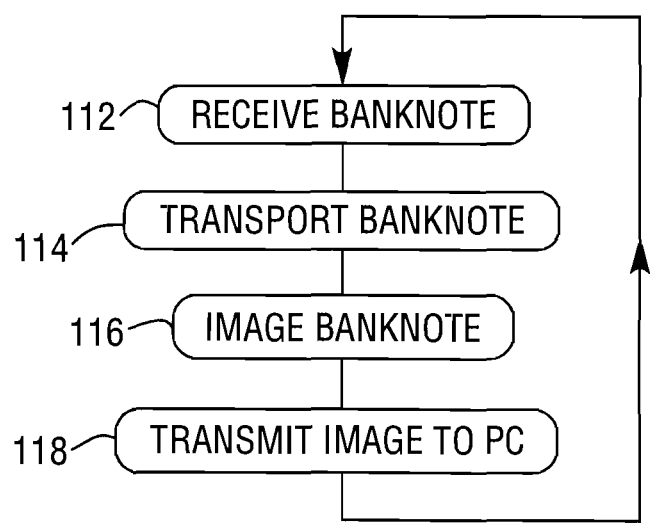
Figure 2C:
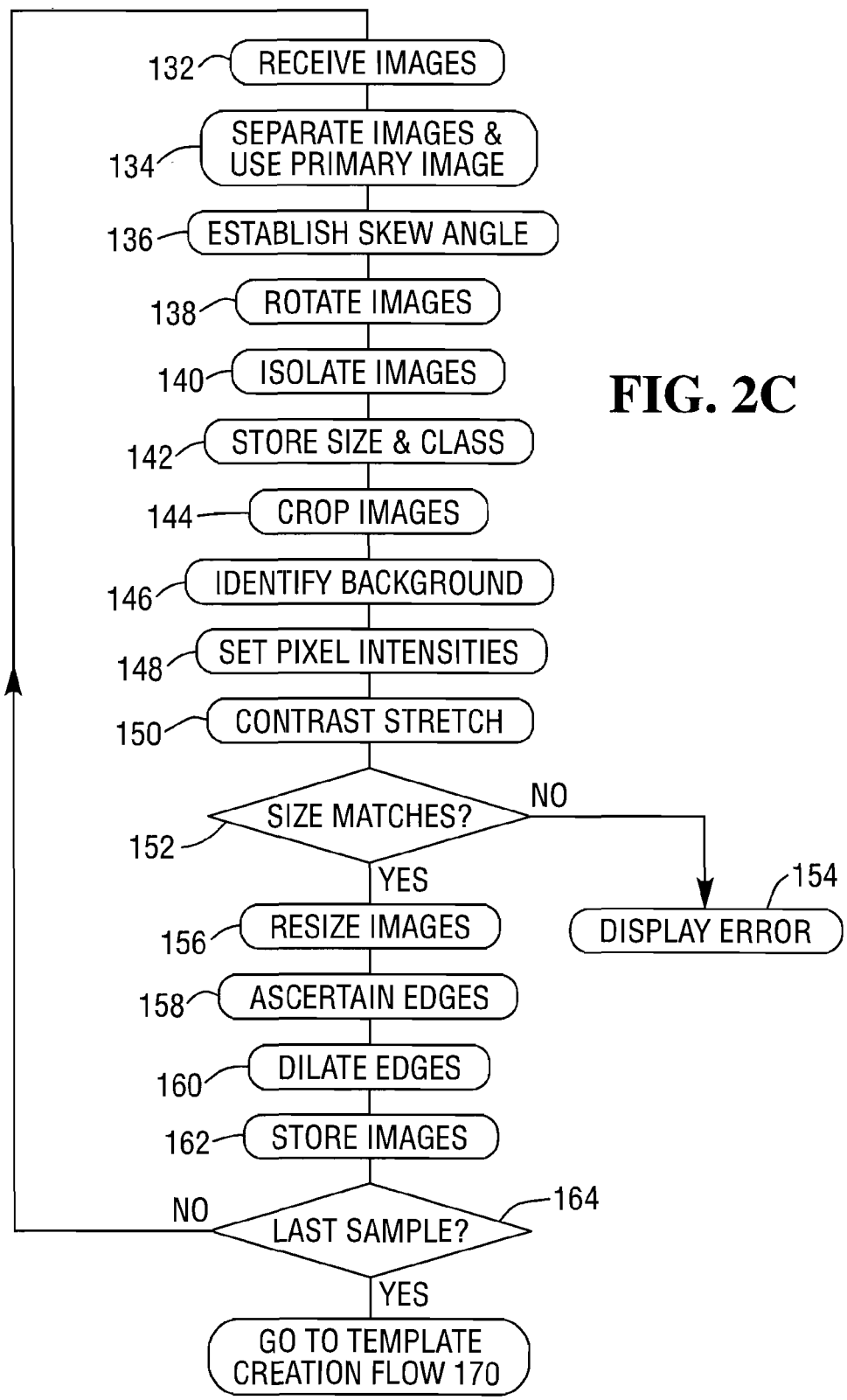
Figure 2D:
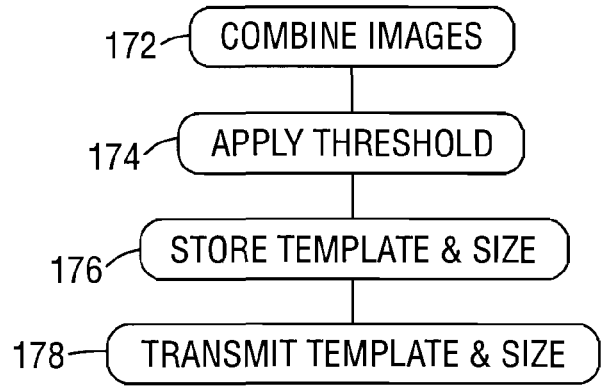
FIG. 2d is a flowchart illustrating steps implemented by the PC in creating a template for a specific type and orientation of media item inserted into the media validation module of FIG. 1.

The operation of the media validation module will now be described with reference to FIGS. 2a to 2d, which are flowcharts illustrating the steps involved in creating a template for a specific type and orientation of banknote 20. FIG. 2*a* illustrates the steps implemented by the PC 50. FIG. 2*b* illustrates the steps implemented by the module 10 in data collection mode, and FIGS. 2*c* and 2*d* illustrate steps implemented by the PC 50 in response to data received from the module 10.

Referring first to FIG. 2*a*, the first step is for the user to launch the template creation program (hereinafter "template program") 62 on the PC 50 (step 102). This template program 62 presents a graphical user interface on the display 52 inviting the user to enter information about the media items that will be inserted into the module 10 (step 104). The information may be selectable from drop down menus, but includes the ability for a user to enter new information. In this embodiment such information includes the currency (for example, U.S. dollars, U.K. pounds, Euros, and the like), the denomination (for example, 10, 20, 50, 100, 200, 500, 1000, and the like), the series (for example, 1993 to 1996, 1996 to 2003, or the like), the orientation (of which there are only four: face-up forward, face-up reverse, face-down forward, face-down reverse), the number of media items in the sample (for example, ten, twenty, fifty, a hundred, a thousand, or the like), and the like. The combination of the currency, denomination, series, and orientation comprise the class of the media item. One identification template will be created for each class of media item; and four associated classes are required for each unique combination of currency, denomination, and series that is to be identified.

Once a user has entered the information then the template program 62 converts the entered information into predetermined codes (step 106). For example, U.S. dollars may have the code "USD", a twenty dollar bill may have the code "20", a face-up forward orientation may have the code "FUF", and the like. In this example the user will insert fifty, one hundred dollar bills ($100 US) from the series 1993 to 1996 in the face-up forward orientation.

The PC 50 then informs the user, via the display 52, to begin inserting the banknotes 20, and awaits data transfer from the module 10 (step 108).

Referring now to FIG. 2*b*, which shows the flow 110 occurring at the module 10, the first step is for the user to insert the first banknote 20 in a first orientation (in this embodiment face-up forward), which the module 10 receives (step 112).

The controller 34 then transports the banknote 20 to the examination area 22 (step 114) and causes the image collection component 30 to capture three images of the banknote 20 (green reflected, green transmitted, and IR transmitted) (step 116).

The image collection component 30 transmits the captured images to the controller 34, which transmits the captured images to the PC 50 for processing (step 118).

The process then reverts to step 112, at which the user inserts another $100 banknote.

Processing of the captured images will now be described with reference to FIGS. 2*c* and 2*d*. FIG. 2*c* is a flowchart illustrating the image conditioning flow 130 at the PC 50. The image conditioning flow 130 comprises the steps performed by the PC 50 on the images transmitted from the module 10. The template program 62 uses the conditioning component 64 to implement the image conditioning flow 130.

The PC 50 receives the images for individual banknotes 20 from the module 10 (step 132) as they are imaged. Thus, even though the module 10 will image fifty banknotes 20 for the identification template, the module 10 conveys images for each banknote 20 as soon as the images are captured. As stated above, three images are captured for each banknote 20. These three images may be provided to the PC 50 as an interleaved file or as separate images.

The conditioning component 64 only uses one of the three images to create a template (the green reflected image in this embodiment), but it processes all three images identically because the other two images (the green and IR transmitted images) provide useful information. The conditioning component 64 therefore selects and saves the green reflected image as the primary image, and saves the other two images as secondary images (step 134).

The conditioning component 64 then establishes the skew angle of the banknote 20 (step 136). This could be done using sensors (not shown) associated with the transport mechanism 14, but in this embodiment the skew angle is ascertained by operating on the pixels in the captured primary image. Various techniques are known in the art for ascertaining edge boundaries. In this embodiment an edge filter is used to ascertain all four sides of the banknote 20. By finding all four sides a more accurate assessment should be possible than if only one side was located.

Based on the ascertained location of the corners of the banknote 20, and the angle of the edges of the banknote 20, the conditioning component 64 can rotate the primary and secondary images to correct for the skew (step 138). This can be implemented using any rotation algorithm known in the art, such as sheer rotation, bilinear interpolation rotation, or the like.

The conditioning component 64 then isolates the de-skewed images (step 140) so that the de-skewed images only contain an image of the banknote 20 plus any background exposed by a defect within the banknote 20, such as a corner fold, a tear, a hole, or the like. This isolated images inherently include information about the size of the banknote 20: the number of pixel rows and pixel columns that comprise the images being an indicator of the size of the banknote 20. The conditioning component 64 calculates the size of the banknote 20 based on the number of pixels, and stores the banknote size in the PC memory 54 (step 142) together with the class of the banknote 20 (which was entered by the user at step 104 in FIG. 2*a*).

To remove the unwanted effects of folds and edge aberrations, the conditioning component 64 crops the isolated images around all four edges by a predetermined (but small) number of pixels (step 144). The number of pixels removed is typically associated with the resolution of the image, but removing edge pixels representing a 2 or 3 mm perimeter is usually sufficient. Removing pixels corresponding to the periphery of the banknote 20 provides a more reliable template because this removes "noise" due to larger folds and tears that typically occur more commonly on the edges of banknotes. The main disadvantage is that cropping the banknote images reduces the amount of data available for processing.

The conditioning component 64 then inspects the cropped images to identify vestiges of background data (step 146), which are caused by apertures in the banknote 20 or areas of the banknote 20 that are very thin. These areas are most easily found using one of the secondary images (which are transmission images) because saturation points are produced where light passes straight to the optical imager 28 without having to pass through the banknote 20. Since this light is not attenuated by the banknote 20, the intensity recorded by the optical imager 28 at those points is very high.

The conditioning component 64 then sets the pixel intensities at those points to a mid-value (step 148). This mid-value may be the average intensity of the note or a preset value, such as a mid-grey.

The conditioning component 64 then normalizes the images to remove effects of wear, illumination variation, and the like (step 150). This is done via contrast stretching, which involves assigning the darkest pixels to zero and the brightest pixels to the maximum value. In this embodiment, the darkest 1% of pixels are set to zero ("0"), and the brightest 1% of pixels are set to "255" (because it is an 8 bit system). All other pixel intensities between the darkest and brightest one percent of pixel intensities are linearly scaled so that their intensities are between "1" and "254". This linearly stretches all values between the highest and lowest 1% of pixel intensity to utilize the full dynamic range of the 8 bit system. This contrast stretching is calculated separately for the primary image and each of the secondary images because the intensities in each image will be different.

The conditioning component 64 then compares the calculated size of the banknote 20 with known banknote sizes (step 152). The conditioning component 64 may store, or have access to, typical sizes of each media item that may require validation by the module 10. This information can obtained from published information from banknote printers, or banknotes can be measured and their sizes entered into the conditioning component 64 by a user.

If the calculated size of the primary image is not approximately the same as the expected size (or is not within a range of typical banknote dimensions, for example 160 mm×80 mm) then the conditioning component 64 presents an error to the user on the display 52 (step 154).

If the calculated size of the primary image is approximately the same as the expected size, then the conditioning component 64 resizes each image (by magnifying or shrinking the entire image) to a fixed size (step 156); however the original size data is maintained. Resizing each image facilitates subsequent comparison of images, and optimizes memory use. In this embodiment, the fixed size is 40 mm by 80 mm.

If memory or processing speed is adversely affected by the number of pixels, then the conditioning component 64 can reduce the resolution of each image. Images with a resolution as low as 25 dpi have been tested and successfully used as templates. However, even 25 dpi may not be the lower limit of resolution that can be successfully used.

Each image is then processed to ascertain the strongest edges within that image (step 158). The processing employed in this embodiment is similar to that of a high pass filter. There are several ways known in the image processing art to implement this. This embodiment uses what is known as a "Canny" filter.

A Canny filter implements two convolutions of the input image (intensity distribution function) with the x- and y-derivatives of a Gaussian function. This is equivalent to first smoothing the input image with a Gaussian function and then computing the x- and y-derivatives. The two convolution results represent the x- and y-components of the scale-dependent gradient of the image intensity distribution function. A threshold (which may be automatically generated or manually selected) identifies the positions of the largest gradients in the image. These are the strongest contrast edges within that image.

Figures 3, 4, 5, 6:
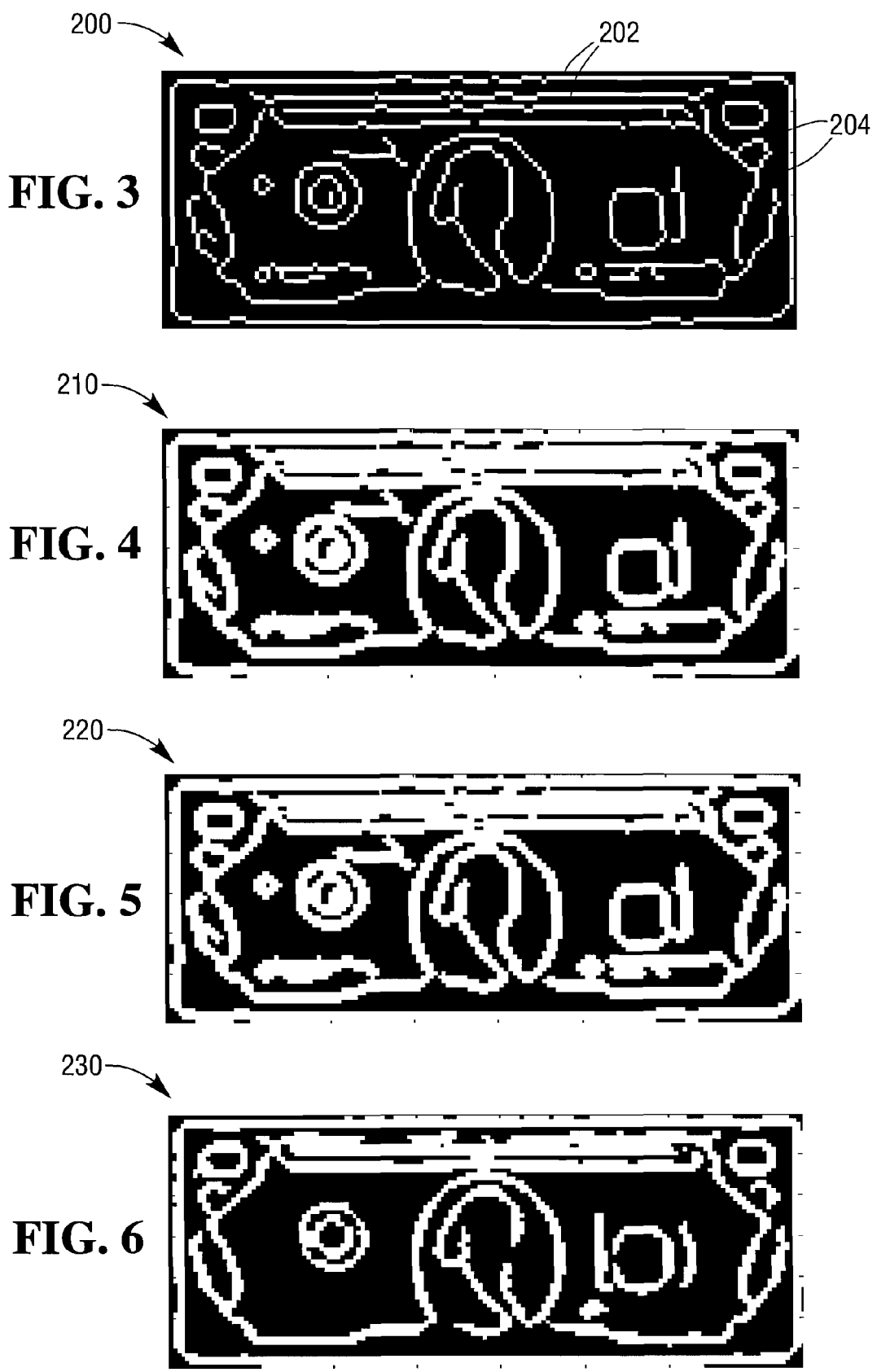
FIG. 3 is a pictorial view of a media item (a banknote) after one of the steps (the Canny filter step) of the process of FIG. 2c.
FIG. 4 is a pictorial view of the banknote after another of the steps (pixel dilation) of the process of FIG. 2c.
FIG. 5 is a pictorial view of the banknote after one of the steps (the threshold filter step, with a 50% threshold) of the template creation process of FIG. 2d.
FIG. 6 is a pictorial view of the banknote after an alternative threshold filter step, with a 75% threshold.

Each position corresponding to a strong contrast edge is given the value "1" and low gradient areas (which represent weak contrast edges and continuous tones) are given the value "0". Hence a 1-bit (binary) image is generated. FIG. 3 illustrates an example of a binary image 200 of the banknote 20, in which strong contrast edges (values of "1") 202 are shown as white and weak contrast edges (values of "0") 204 are shown as black.

As can be seen from FIG. 3, the binary image 200 has very narrow edge boundaries 202 and subsequent banknotes under test (that is, subsequent samples) would have to be aligned very accurately for a successful comparison to be made, particularly if only a simple matching algorithm was being used. To overcome this, the conditioning component 64 dilates the strong contrast edges 202 (step 160), for example by one pixel in all directions from each existing pixel. The resultant dilated image 210 appears as shown in FIG. 4.

The conditioning component 64 stores the dilated image for each of the primary and the two secondary images, so that three dilated images are stored for each banknote 20 (step 162).

The conditioning component 64 then ascertains if the images processed (that is, the images of banknote 20 at this stage) are the last images in the sample (step 164). This is ascertained by maintaining a count of images received and comparing it with the sample size entered at step 104 (FIG. 2*a*).

If there are more images to be received, then the conditioning component 64 returns to step 132 and repeats the processing steps through to step 162 for the next set of images.

If there are no more images to be received, then the template program 62 implements the template creation flow 170, as illustrated in FIG. 2*d*, using the template creation component 66.

In template creation flow, the template program 62 combines corresponding images (by adding pixels from corresponding images on a pixel by pixel basis) (step 172) to produce three combined images (one for the primary image (green reflected), and one each for the two secondary images (green transmitted and IR transmitted)). For example, fifty primary images (the sample size) are combined to create an image having the same number of pixels as each primary image, but each pixel having a value between zero and fifty (rather than zero and one).

The template program 62 can create one, two, or three templates for each class (currency, denomination, series, and orientation) of banknote. In this embodiment, it would not be optimal to use an IR transmitted template for media identification because some counterfeit banknotes would not be a close match to the IR transmission of the genuine banknote, so such counterfeits would not be identified as purporting to be a genuine banknote. In this embodiment, only one template is created for each class, based on the primary image (green reflected).

Once all of the primary dilated images have been combined, the template creation component 66 then applies a threshold filter to the combined primary image (step 174). This threshold filter is used to convert the combined primary image to a binary image (having all pixel values of either zero or one). A range of possible threshold values can be used, but in this embodiment the threshold value of 50% is applied. This means that any pixel having a value less than "25" (50% of the maximum value, which is "50") is set to zero, and any pixel having a value greater than or equal to "25" is set to one. Once the threshold filter has been applied, the resulting image is used as a template for that class of banknote. FIG. 5 is a pictorial view of the template 220 created by applying a threshold filter with a value of 50%.

Other values of threshold between 25% and 75% have been used successfully. FIG. 6 is a pictorial view of the template 230 created by applying a threshold filter with a value of 75%.

The advantage of using a higher threshold is that it produces crisper edges; the advantage of using a lower threshold is that it enables a match with a wider statistical distribution of banknotes of that class. However, changing the threshold from 25% to 75% in practice has not had a significant effect on the performance of the system 8.

The combined image 220 created using a threshold filter set to 50% is saved as the template to be used for testing this class of media item, together with information about the average size of the banknote 20 (step 176). The average size of the banknote 20 is ascertained by averaging the banknote size information stored in step 142 for all of the fifty samples. This template (together with the average banknote size information) is then transmitted to the media validation module 10 for storing in memory 38 (step 178).

Once the template 220 has been created for this class, the user then repeats this process for the other three orientations. For example, the user returns to step 104, selects a different orientation for the same fifty banknotes (for example, face-up reverse), and then feeds in the same fifty banknotes in that second orientation (so that a template can be created for this second orientation by following steps 106 to 178).

Once the process has been performed for all four orientations, the template program 62 will have stored four templates for the same banknote type, one for each orientation, together with information about the average banknote size.

If the media validation module 10 is to receive only one currency (for example, U.S. dollars) then the process is performed for each denomination that is to be received (for example, twenty dollar bills, fifty dollar bills, and hundred dollar bills) in each of the four orientations. The process is also performed for each series of a particular denomination, for example pre-1993, 1993 to 1996, and 1996 to 2003, in each of the four orientations. Thus, an image template is created for every unique combination of: currency, denomination, series, and orientation.

Once all required templates have been created and stored, the media validation module 10 can be operated in identification mode, as will now be described with reference to FIG. 7, which shows the flow 300 of steps performed by the module 10 in identification mode. The initial steps performed in identification mode are almost identical to those steps performed for the module flow 110, and image conditioning flow 130. When operating in identification mode, the module 10 does not need to be coupled to the PC 50.

Identification Mode

Figure 7B:
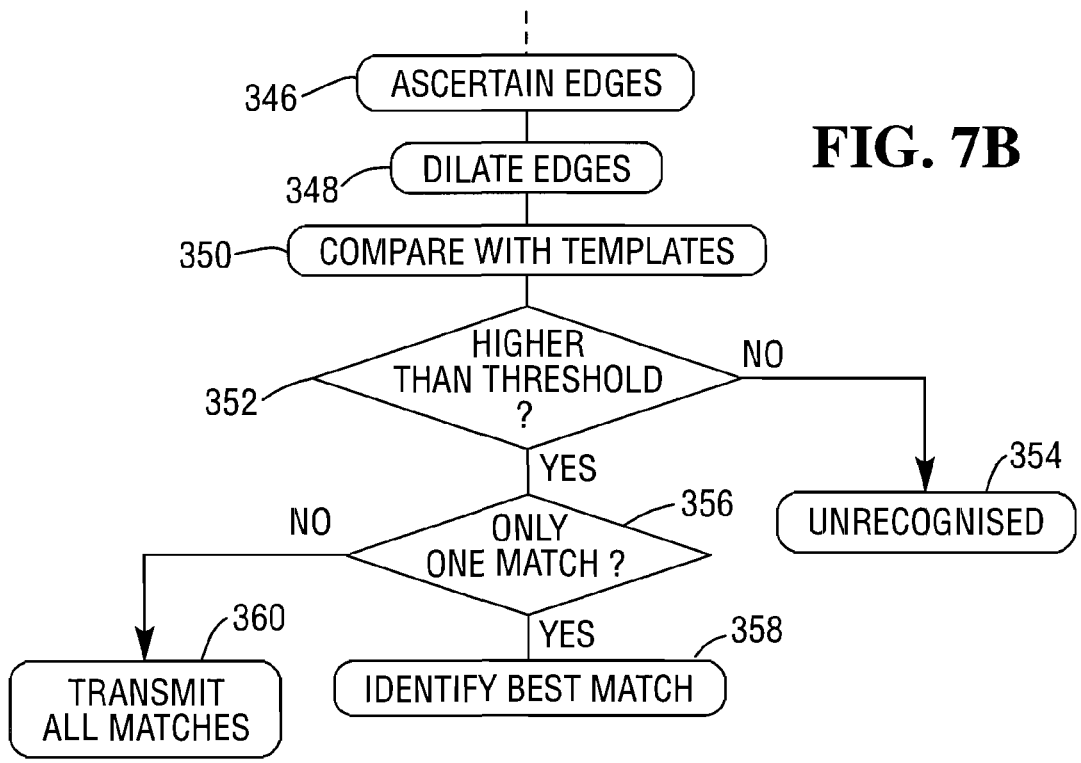
FIG. 7 is a flowchart (split into two parts—labeled 7a and 7b—to fit onto the drawing sheets) illustrating steps in identifying a media item inserted into the media validation module of FIG. 1 using templates created by the template creation process of FIG. 2d.
Figure 7A:
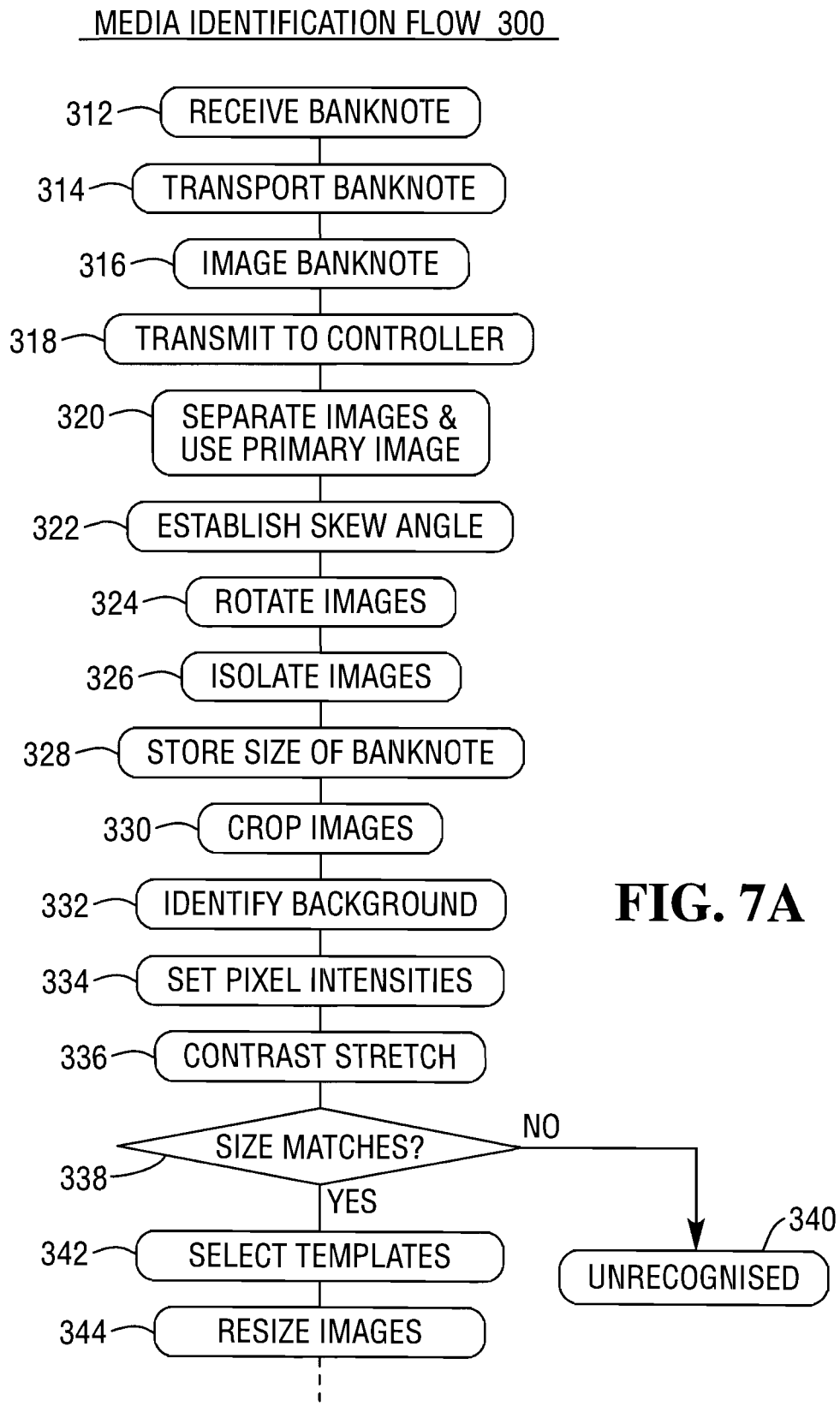

Referring now to FIG. 7, in identification mode, the user inserts a banknote in any of the four orientations (in this example face-up reverse), which the module 10 receives (step 312).

The controller 34 then transports the received banknote to the examination area 22 (step 314) and causes the image collection component 30 to capture three images of the banknote (green reflected, green transmitted, and IR transmitted) (step 316).

The image collection component 30 transmits the captured images to the controller 34 (step 318) for conditioning (pre-processing).

The controller 34 includes the same functionality as provided by the conditioning component 64 (in the PC 50), so that the controller 34 processes the received images in a very similar manner to that described with reference to FIG. 2c. For this reason, steps 320 to 348 of FIG. 7 will only be explained very briefly because they correspond to steps 134 to 162 of FIG. 2c.

In this embodiment, the controller 34 only uses one of the three captured images to identify the banknote (the green reflected image in this embodiment), but it processes all three images identically because the other two images (the green and IR transmitted images) can be used for validating the banknote (not described herein). The controller 34 therefore selects and saves the green reflected image as the primary image, and saves the other two images as secondary images (step 320).

The controller 34 then establishes the skew angle of the banknote (step 322) by operating on the pixels in the captured primary image.

Based on the ascertained location of the corners of the banknote, and the angle of the edges of the banknote, the controller 34 can rotate the primary and secondary images to correct for the skew (step 324).

The controller 34 then isolates the de-skewed images (step 326) so that the de-skewed images only contain an image of the banknote plus any background exposed by a defect within the banknote, such as a corner fold, a tear, a hole, or the like.

The controller 34 calculates the size of the banknote based on the number of pixels, and stores the banknote size in the memory 38 (step 328). At this stage of identification, the controller 34 does not know the class of the banknote.

To remove the unwanted effects of folds and edge aberrations, the controller 34 crops the isolated images around all four edges by a predetermined (but small) number of pixels (step 330).

The controller 34 then inspects the cropped images to identify vestiges of background data (step 332), which are caused by apertures in the banknote 20 or areas of the banknote 20 that are very thin.

The controller 34 then sets the pixel intensities at those points to a mid-value (step 334). This mid-value may be the average intensity of the note or a preset value, such as a mid-grey.

The controller 34 then normalizes the images to remove effects of wear, illumination variation, and the like (step 336). This is implemented as described above with reference to FIG. 2c (at step 150).

The controller 34 then compares the calculated size of the banknote with the banknote sizes for all of the templates stored in memory 38 (step 338). A margin of error is provided because banknotes can shrink with age. Typically, the banknote being identified must match the size of a template within a preset percentage (such as five percent), or within a preset dimensional tolerance, such as plus or minus two millimeters (2 mm).

If the calculated size of the banknote does not match (within the margin of error) the banknote size of any of the templates, then the controller 34 returns the banknote to the user and provides a signal to the external unit (an ATM in this embodiment) via the data and power interface 32 (step 340). This signal indicates to the ATM that the banknote was not recognized. The ATM may then present a screen on the ATM's display informing the user that the banknote cannot be processed and inviting the user to retrieve the banknote from the module 10.

If the calculated size of the banknote does match (within the margin of error) the banknote size of some of the templates, then the controller 34 selects those matching templates (step 342).

The controller 34 then resizes the primary image and secondary images (step 344) to the fixed size used in step 156 (FIG. 2*c*), namely 40 mm by 80 mm. The calculated size should always match a multiple of four templates.

Each resized image is then processed using a "Canny" filter to ascertain the strongest edges within that image (step 346) in a similar way to that described with reference to FIG. 2*c* (at step 158).

The controller 34 then dilates the strong contrast edges (step 348), for example by one pixel in all directions from each existing pixel.

The controller 34 then compares the dilated primary image with all templates that matched the size of the banknote being recognized (that is, those templates identified at step 342) (step 350). In this embodiment, the comparison is performed using a two-dimensional correlation.

The particular 2D correlation used in this embodiment is as follows: First, calculate the mean pixel values for image A (unknown image) and image B (template image). For each pixel in image A calculate the difference (Az) between the pixel and its image mean (Amn–A), and for each pixel in image B calculate the difference (Bz) between the pixel and its image mean (Bmn–B), then multiply these two differences (Az*Bz). Sum all of the products produced for each pixel. Divide this summed product value by the square root of the products of the sum of all the differences squared of image A and sum of all the differences of image B, as shown in the equation below.

$$r = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}}$$

To improve processing speed, the difference (Bz) between the pixel and its image mean (Bmn–B) for the template image is calculated in advance and stored as part of the template.

Each template tested against the dilated primary image generates a score (a correlation coefficient, which is "r" in the above equation) indicative of how good a match there is. The highest possible score in this embodiment is "1.000", the lowest possible score, in theory, is "−1.000", but scores less than "−0.100" are very uncommon. In practice, the score for the template matching the dilated primary image is typically less than "0.8", and other scores are very much lower; although these values are influenced by the particular correlation and settings used.

The controller 34 ascertains if any template achieves a score above a match threshold, in this embodiment "0.700" (step 352).

If no template achieves a score above the match threshold then the controller 34 returns the banknote to the user and provides a signal to the external unit (an ATM in this embodiment) via the data and power interface 32 (step 354). This signal indicates to the ATM that the banknote was not recognized. The ATM may then present a screen on the ATM's display informing the user that the banknote cannot be processed and inviting the user to retrieve the banknote from the module 10.

If at least one template achieves a score above the match threshold, then the controller 34 ascertains how many templates score above the match threshold (step 356). Typically, only one template will achieve this score, but occasionally two templates may achieve a score in excess of the match threshold, for example, because the module 10 may not store a template for the banknote under test.

If only one template achieves the match threshold, then controller 34 identifies the template that matches and provides details of this template to a media validation program (not shown) (step 358). This identifies the type of banknote to the media validation program. If the media validation program does not validate this banknote (for example, based on a validation template for this banknote), then it is declared to be a possible counterfeit.

If more than one template achieves the match threshold, then controller 34 identifies those templates and provides details of those templates to the media validation program (not shown), together with an indication of which achieved the highest score (step 360). This provides a list of potential banknote identities, with the most likely identity being indicated. Providing more than one potential banknote identity may only be implemented for templates relating to banknotes having special editions or minor updates, so that a close match could be expected for more than one template.

Where a list of potential banknote identities is provided, the media validation program can then attempt to validate this banknote against validation templates for each of the banknote identities. If it matches one of them then it can be accepted as valid. If it does not match any of them then it may be declared as a potential counterfeit of the banknote with the highest match threshold score in the list.

It will now be appreciated that this embodiment has the advantage that counterfeit banknotes pass the recognition test but should fail the validation test (or tests). If a banknote was not recognized then no validation test could be performed.

It should now be appreciated that the above embodiment has the following advantages. It is reliable. The templates are small in terms of memory use compared to the banknote size. It is fast, both in terms of testing (typically microseconds per banknote class) and template generation (typically seconds once images have been captured). Adding templates is trivial—no retraining of previously used banknotes is necessary. The condition of the banknote does not detract from the edge detection process, particularly where normalization is used. Tears and folds are handled in such a way that performance is not unduly compromised. Although not ideal, an identification template can be generated from a single banknote sample as the identification template is not statistically derived. The system is automatic. The same images captured for use in identifying a banknote (or other media item) can also be used for validating the media item, without having to capture any more images.

Various modifications may be made to the above described embodiment within the scope of the invention, for example, In other embodiments, the entrance port 16 may be coupled to a media separating unit for (i) receiving a bunch of media items, (ii) separating the bunch into individual media items, and (iii) presenting the separated media items on a per item basis to the entrance port 16.

In other embodiments, only a single image may be captured at the image capture step 106 during template creation. The single image is preferably, but not necessarily, a reflected image from a visible illumination source.

In other embodiments, the module 10 may buffer images in local memory and transmit all images from a sample of media items as a single transmission to the PC.

In other embodiments, the module 10 may include a user interface and may execute the template creation program 62 locally on the module 10 (rather than on the PC 50). This would mean that no PC 50 would be required. The PC 50 is primarily used because of lack of storage, visual output, and computational capacity on the media validation module 10.

In other embodiments, the predetermined codes entered in step 106 may only be numeric, not alphanumeric.

In the above embodiment, an edge filter is used to ascertain all four sides of the banknote 20. In other embodiments, other techniques may be used to ascertain all four sides of a media item. Alternatively, only one side of a media item may be ascertained, and extrapolation techniques may then be used to locate the corners (or virtual corners in the event of a tear or fold at the corner) of the media item.

In other embodiments, the conditioning component 64 may resize each image (by magnifying or shrinking the entire image) to a different fixed size (such as 80 mm by 160 mm); alternatively, the conditioning component 64 may resize each image to the size expected for that type of media item.

In other embodiments, at step 350 a Boolean operation (for example, a logical AND, NAND, OR, XOR, or the like), or a different correlator, may be performed instead of a two-dimensional correlation.

In the above embodiment, all three images are captured and processed to create a template. In other embodiments, a single image may be captured and used to create a template. In still other embodiments, three templates may be created, one from each image, so that a media item is validated by comparison with all three images.

In other embodiments, different, or additional, illumination sources (for example, a Red LED, a Blue LED, a UV LED, multiple IR LEDs of different wavelengths, or the like) may be provided above and/or below the examination area 22.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A method of creating a template for identifying a media item, the method comprising:
    (a) receiving an image of a media item from an imager while the media item is selectively illuminated with: an upper linear array of green Light Emitting Diodes (LEDs) that illuminates across a long edge of the media item, a lower linear array of green LEDs that illuminates across the long edge of the media item, and a lower linear array of Infrared (IR) LEDs that illuminates across the long edge of the media item, obtaining reflectance measurements from the upper linear array of green LEDs when the lower linear array of green LEDs and the lower linear array of IR LEDs are de-energized, and obtaining a first transmission measurement from the lower linear arrays of green LEDs while the upper linear array of green LEDs and the lower linear array of IR LEDs are de-energized, and obtaining a second transmission measurement from the lower linear array of IR LEDs while the upper linear array of green LEDs and the lower linear array of green LEDs are de-energized;
    (b) creating a monochromatic image based on high contrast boundaries within the received image by 1) identifying from the image four corners of the media item, 2) determining a size of the media item from the image in pixels, surrounded by the four corners, cropping the image by a predetermined amount from the identified corners producing a modified image, and processing a high-pass filter on the modified image for identifying strongest edges within the modified image and creating the monochromatic image as the modified image following processing of the high-pass filter;
    (c) repeating steps (a) to (b) for another instance of : 1) a same type of media item as a type of media associated with the media item, 2) in a same orientation as an original orientation that the media item was presented for receiving the image, 3) a same denomination that is associated with the media item, and 4) a same series that is associated with the media item; and
    (d) averaging the monochromatic images to create a template for the type of media and the original orientation of the media item and the instance.

2. A method according to claim 1, wherein the method comprises the further step of (b-1) ascertaining external dimensions of the media item from the received image.

3. A method according to claim 1, wherein the method comprises the further step of (e) applying a threshold filter to the averaged monochromatic images to create a template with sharp edge boundaries.

4. A general purpose computer programmed to implement all of the steps of claim 1.

* * * * *